United States Patent
Perry et al.

(10) Patent No.: US 8,523,045 B2
(45) Date of Patent: Sep. 3, 2013

(54) METHOD OF JOINING COPPER CONDUCTORS

(75) Inventors: Thomas A. Perry, Bruce Township, MI (US); James G. Schroth, Troy, MI (US); David R. Sigler, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/396,692

(22) Filed: Feb. 15, 2012

(65) Prior Publication Data

US 2012/0273557 A1  Nov. 1, 2012

Related U.S. Application Data

(60) Provisional application No. 61/480,469, filed on Apr. 29, 2011.

(51) Int. Cl.
*B23K 11/00* (2006.01)
*H05B 3/10* (2006.01)

(52) U.S. Cl.
USPC ........ 228/198; 228/193; 228/194; 219/78.01; 219/552

(58) Field of Classification Search
USPC ............ 228/193, 194, 198; 219/78.01, 85.1, 219/552
See application file for complete search history.

(56) References Cited

U.S. PATENT DOCUMENTS

| | | | | |
|---|---|---|---|---|
| 4,331,286 | A * | 5/1982 | Miyazaki et al. | 228/198 |
| 4,460,658 | A * | 7/1984 | Bose et al. | 428/606 |
| 5,330,097 | A * | 7/1994 | Inoue | 228/194 |
| 6,621,037 | B2 * | 9/2003 | Gabbianelli et al. | 219/94 |
| 7,401,726 | B2 * | 7/2008 | Tarui et al. | 228/248.1 |
| 2003/0024969 | A1 * | 2/2003 | Harris | 228/262.61 |
| 2010/0258537 | A1 | 10/2010 | Sigler et al. | |
| 2011/0012471 | A1 | 1/2011 | Dang et al. | |

* cited by examiner

*Primary Examiner* — Devang R Patel
(74) *Attorney, Agent, or Firm* — Reising Ethington P.C.

(57) ABSTRACT

Copper conductor members or other copper-base workpieces are welded using a suitable copper alloy material that is reactive with the joining surfaces of the copper members. The reactive metal material may be applied as a thin metal strip between assembled facing joining surfaces. The members are pressed together against the reactive material and heated. The combined pressure and heat enable the reactive material to react with facing workpiece material, to liquefy and remove oxides or the like that might inhibit the formation of a welded interface. The liquid, containing original reactive metal and byproducts, is squeezed from the interface of the workpieces to enable the formation of a solid-state weld between them without melting of un-reacted workpiece copper material.

23 Claims, 2 Drawing Sheets

METHOD OF JOINING COPPER CONDUCTORS

This application claims priority based on provisional application 61/480,469, titled "Method of Joining Copper Conductors," filed Apr. 29, 2011 and which is incorporated herein by reference.

TECHNICAL FIELD

This invention pertains to relatively low temperature, low heat input methods of forming a strong weld between facing surfaces of copper workpieces. The weld is formed by a metallurgical reaction joining process that leaves a low electrical resistance, copper-to-copper weld between the workpieces. Such resulting welded joints are very desirable, for example, when formed between pairs of copper conductors in an electric motor.

BACKGROUND OF THE INVENTION

While there are many welding practices used for joining workpieces of many metal compositions, there remains a need for a method of forming a sound, low resistance, welded joint with minimal deformation and heat input between two copper workpieces. There is a particular need for such a joining method for use in forming welded connections between separate pairs of copper conductor bars, in an assembly of many such copper conductor pairs, in a stator member of an electric traction motor for a vehicle.

SUMMARY OF THE INVENTION

This invention uses a metallurgical reaction joining process to form sound, strong, low electrical resistivity welds between facing surfaces of assembled copper workpieces. In an illustration of one embodiment of the invention, two copper conductor members in the form of wires or bars of small rectangular cross-section and like facing surfaces for contact are placed and pressed together and joined in a welded interface. Thus, in this embodiment of the invention, the copper workpieces are substantially pure, high electrical conductivity, copper metal. In the metallurgical reaction process, a thin layer of a reactive metal or alloy is placed between the facing surfaces of the copper workpieces and, when heated, the reactive metal acts to clean and smooth the surfaces to allow intimate contact over broad areas and the formation of a solid-state weld.

The reactive metal or metal alloy is selected to provide important functions as part of the welding process. Such a metallurgically reactive metal composition must form a mobile liquid phase through reaction with a small amount of material from each of the facing copper workpiece surfaces under the influence of applied heat. The liquid phase must have a solidus temperature that is lower than the melting point of the workpiece metal. And the mobile phase that is formed must be capable of removing oxide films initially present on the copper workpiece surfaces to be joined. The intended function of the mobile phase is to remove such films that are an impediment to a copper surface-to-copper surface weld. A surface smoothing effect is achieved during the reaction process, i.e., a very thin layer on each workpiece surface is eliminated through a combination of dissolution of a portion of the copper workpieces and expulsion of the reacted metal under pressure. This is conducted to form a low resistance welded joint, typically between high conductivity copper workpieces.

In many embodiments of the invention a desired joint depends upon forcing the reactive metal out of the joint with minimal attack of the copper workpieces. In these embodiments, it is preferred that the area of the facing copper workpiece surfaces to be joined should have similar mating geometries, i.e., flat to flat, fixed convex radius to fixed concave radius, or the like, and the resulting surface roughness must be sufficiently smooth that sound joints can be created with minimal retention of the filler metal. Because the reactive material is largely forced from the joint, the final joint has electrical resistivity nearly identical to that of an autogenously formed joint.

In an illustrative embodiment of this invention, a thin metal strip of an alloy of about seven percent by weight phosphorus and the balance copper is a suitable reactive metal for joining substantially pure copper workpieces. Copper has a melting point of 1084° C. while copper-7 wt. % phosphorus alloy has a melting temperature of 710° C. And this copper-phosphorus alloy is capable of dissolving or fluxing the surface oxides present at the copper-to-copper workpiece interface as well as reacting with and dissolving a portion of the copper workpieces. Another suitable reactive metal composition for welding copper is an alloy of copper with, by weight, 6% phosphorus, 6% tin, and 0.4% silicon. Still another reactive metal composition for welding copper is an alloy of copper with, by weight, 15% silver, and 5% phosphorus. The process is conducted by placing a thin (for example, 50 to 250 microns thick) piece of the reactive metal between facing surfaces of the copper workpieces to be joined. The sandwich joint is then compressed and heated to a temperature well above the solidus temperature of the metal/reactive metal alloy system, i.e., above 710° C. when using the copper-7% phosphorus alloy, but well below the melting point of copper, i.e., below 1084° C.

A convenient method of compressing while heating is to use resistive heating, as is provided by engaging outer surfaces of the facing workpieces with opposing electrodes of a commercial spot welder. The clamping force of the spot welder provides the required pressure to bring the mating surfaces of the two copper workpieces into contact with the interposed layer of reactive metal. An electrical resistance heating current is passed between the electrodes and through the interface of the workpieces and thin strip of reactive metal. Once heated sufficiently, the metallurgical reaction begins and the reactive metal will liquefy and remove any native oxide on the base metal copper at the interface and further react with copper to form a liquid-containing phase. Applied pressure by the electrodes in combination with smooth, matching or mating surfaces of the copper workpieces will also force the mobile liquid out of the joint. In some cases, a semi-solid phase will exist of sufficiently low effective viscosity that it can be expelled from the joint, just as the case of a pure liquid. This expelled material carries any fluxed oxides or other prior surface-impurities with it to leave clean, smooth copper surfaces. A very clean copper-to-copper weld is formed by this process. The formed joint is not primarily a brazed joint. Detailed microscopy of sections of a thus formed joint verifies that nearly all the reactive metal is expelled from the final copper workpiece-to-copper workpiece weld joint. The method is a relatively low energy method and a relatively low temperature method which can minimize the effect of the joining process on any nearby insulation on the copper workpieces or on other nearby articles.

The method of this invention may be used, for example, in the welding of each of many pairs of ends of copper wires or bars during the assembly and making of a stator for an electric traction motor for driving one or more wheels of an automotive vehicle. The copper wires may, for example, have a thin oxide coating on their surfaces. In making traction motor stators, conductor wire pieces, cut from a coil, are shaped as a "U" or open-loop shape for placement and assembly in slots on inner circumferences of an annular stack of laminated, ferrous metal, stator core plates. The wires or bars may, for example, have a rectangular cross-section and have flat sides of a few millimeters or so in width. The loop-shaped wires, with their cut ends, typically at the same side of the formed shape, are fitted into insulator-lined slots on and around the full inner circumferences of the annular-shaped stack of stator discs. Each end of a stator conductor wire is to be welded to an end of another wire to provide, for example, closed electrical circuits for producing a three-phase electromagnetic field in the ferroelectric stator core for driving a rotor member located axially within a finished stator in operation of a traction motor. The invention can be applied advantageously to many joining situations, including joints between bus bars, between electrical transformer components, and between resistance welding gun components. Although many such assemblies often consist primarily of nearly pure copper, this invention can be applied equally well to so-called high-copper (>96% Cu) alloys with 0-4% alloying elements such as Cd, Cr, Zr, Mg, Fe, P, Be, Co, S, Te, and Pb added individually or in combination to obtain improved mechanical properties, machinability, or other characteristics.

But whatever the assembly in which the joining process is used, copper workpieces with co-extensive facing surfaces with suitably smooth, close fitting shapes are pressed against a thin layer of reactive metal material, for example, up to about 250 micrometers in thickness and coextensive with the facing surfaces. As described above, the assembly is heated by any suitable means to melt the reactive material between the facing surfaces to be joined. The fluid reactive material in contact with the workpiece surfaces serves to metallurgically clean and smooth the facing copper surfaces. As pressure is applied to the heated interface, the mobile liquefied reacted material and reaction products, which also include a small portion of the copper workpiece(s) that is dissolved during the reaction, are substantially completely squeezed from between the cleaned copper surfaces. And the pressure and heat at the interface produces a strong, clean, low electrical resistivity welded bond between the copper surfaces.

Other objects and advantages of practices of the invention will be apparent from the following descriptions of illustrative embodiments of the invention. In some of these descriptions reference is made to drawing figures which are described in the following section of this specification.

BRIEF DESCRIPTION OF THE DRAWINGS

FIG. 3 illustrates the copper-to-copper welded interface with expelled reactive material and by-products at the edges of the weld.

DESCRIPTION OF PREFERRED EMBODIMENTS

Practices of this invention are applicable to the formation of solid-state welded interfaces between copper and copper-base alloy workpieces. It is particularly useful in forming such welded joints between workpieces that have a very high copper content, such as commercial copper wires, bars, and rods, or the like, that are used, for example, as electrical conductors in electrical motors and generators. Two copper materials are commonly used for applications requiring high electrical conductivity. First, OFHC (Oxygen-Free High Conductivity), also known as OFE (Oxygen-Free Electronic) copper, is designated as alloy C10100 and contains 99.99% copper (minimum). The electrical conductivity of OFHC is 101% of the International Annealed Copper Standard (IACS). Second, Electrolytic Tough Pitch (ETP) copper is designated as C11000 and contains, at a minimum, 99.90% copper, and typically contains 0.04% oxygen. This ETP material has a conductivity of 100-101.5% (IACS).

A practice of a preferred embodiment invention will be illustrated in the example of the welding of such high electrical conductivity copper conductor bars in assembling and making a stator member for an electric motor. But the invention is readily adapted to welding other copper workpieces. Preferably, the copper workpieces are high copper-content alloys, such as about ninety-eight percent copper by weight or higher.

Figure 4:
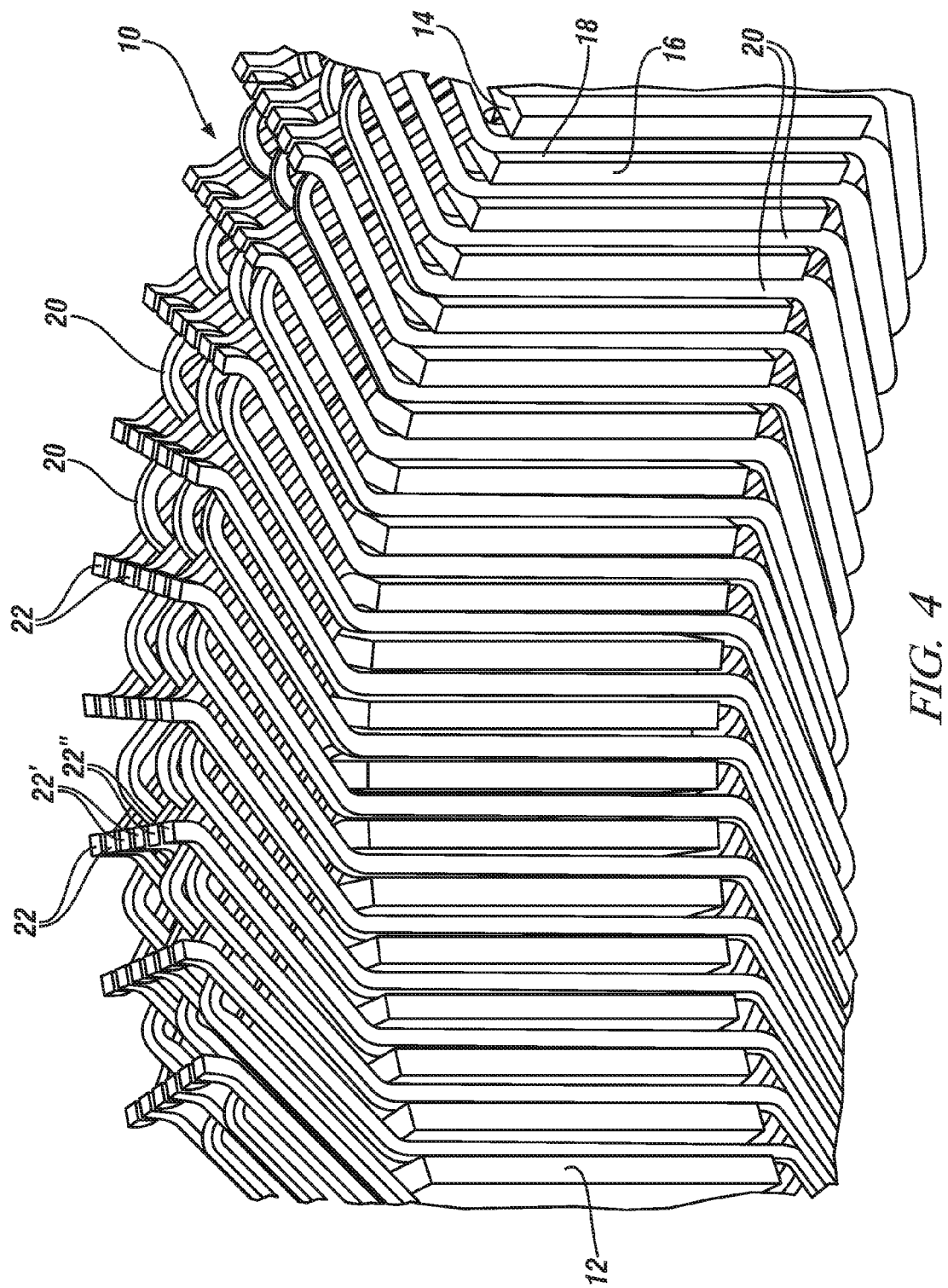
FIG. 4 illustrates a portion of a stator with many conductor wires placed in slots around the circumference of the stator preparatory to welding of ends of the conductors as illustrated in FIGS. 1 and 2.

Many electric motors are used for many purposes in automotive passenger vehicles and the like. Relatively small motors are used, for example, to start a vehicle engine, move passenger seats, open and close windows, circulate heated or cooled air, and drive window wipers. Some relatively larger electric motors are designed as part of the powertrain of the vehicle and contribute to the torque output that ultimately drives one or more wheels of the vehicle. Such traction or drive motors are relatively large compared to other motors used on a vehicle and often require larger and more complicated components and methods of manufacture. For example, FIG. 4 illustrates a view of a portion of a partially assembled stator 10 for an electric traction motor.

Stator 10 is formed of an annular shaped, laminated stack of ferromagnetic metal core pieces 12. It is to be understood that in a typical motor the stack of core piece laminations 12 may comprise more than 100 laminations but, for simplicity of illustration, the many laminations are not illustrated in core piece 12 of FIG. 4. In FIG. 4, the assembly is positioned so that the upper surface and inner circumferential surface 16 of the stack is visible. Many closely and regularly spaced slots 18 are formed to extend radially outwardly from the inner circumferential surface 16, and they typically are formed around the full inner circumference of the stator 10. The slots 18 are aligned co-axially with the axis of the stator and with the axis of rotation of an enclosed rotor in an assembled motor. The slots 18 are often lined with individual films of insulation material, not shown in the complex illustration of FIG. 4. In the example illustrated in FIG. 4, each slot 18 is filled with six preformed loops of commercial copper conductor bars 20. In this illustration, the conductor bars 20 have square cross-sections of a couple of millimeters (or so) on each side, and they are shaped along their lengths such that when they are positioned in slots 18 of stator 10, the upper ends 22 and end portions of the six conductor bars 20 are aligned in each slot 18 as illustrated in FIG. 4.

In this stator embodiment, pairs of stator end portions 22, 22', and 22" of each of the many conductor bars 20 are to be pressed together and welded at their engaging facing surfaces in accordance with this invention. Thus, many welds are formed on adjacent conductor bars in each stator slot and around the entire outer circumference of the stator 10.

Figure 1:
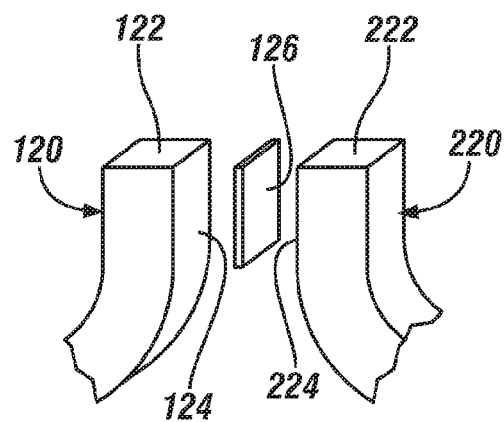
FIG. 1 is a fragmentary schematic illustration of the ends of two copper conductor wires placed with similar mating side surfaces in a facing position with a thin strip of a suitable reactive metal alloy positioned between them. The strip of reactive metal is sized and shaped to interact with the facing surfaces of the conductor wires that are to be cleaned and welded.

The welding process is now described with reference to FIGS. 1-3, and 5. FIG. 1 is a fragmentary view of the end surfaces 122, 222 and broken-away end portions of two of adjacent end portions of two shaped conductors 120, 220 that have been assembled in slots of a stator core, as illustrated in FIG. 4. The opposite ends of these conductors (not shown) would also be welded to different conductors.

In this example, closely-spaced conductors 120, 220 have flat facing surface portions 124, 224 with low roughness and matching geometry that mate well together with a thin sheet piece of reactive metal 126 placed between them to overlie the facing surface portions 124, 224. Conductor bars 120, 220 are formed of substantially pure copper. The surface portions are formed, for example, by stripping off insulation and, optionally to insure surface cleanliness, abrading the surface. Stripping typically results in a variable surface roughness (Sq, 3-dimensional rms roughness) between about 3 to 15 microns. Abrasion produces a more consistent roughness, Sq between 5 and 7.5 microns. The as-stripped surface has a large maximum peak-to-maximum valley dimension of more than 100 microns, caused by the stripping tool, while the abraded surfaces typically have lower maximum peak-to-maximum valley dimensions, as low as 25 microns. Both of these surface conditions have been joined successfully using this process. The sheet piece of reactive metal 126 is suitably an alloy of 93% by weight copper and 7% by weight phosphorus, and has a thickness of about 100 micrometers. Reactive metal piece 126 has an area that corresponds suitably to the facing surfaces 124, 224 of the conductors 120, 220 that are to be welded to complete an electrical circuit path between them.

Figure 2:
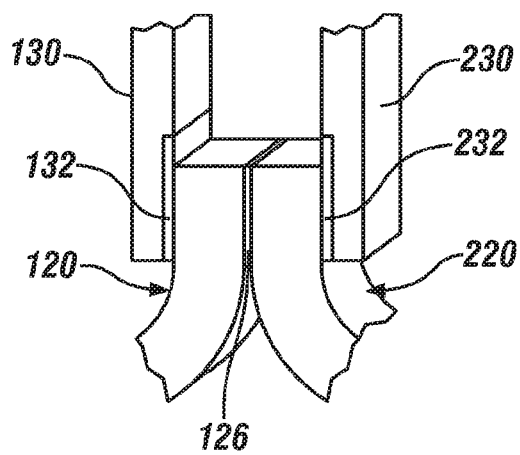
FIG. 2 is a schematic illustration of an apparatus (electrical resistance weld gun arms) for applying pressure to the copper conductor wires of FIG. 1 and heating them so as to cause the interposed reactive metal strip to melt, clean the facing copper surfaces, and to be squeezed from the interface to enable the formation of a weld between the copper conductors.

As illustrated in FIG. 2, a pair of opposing welding electrode jaws 130, 230 are pressed against opposite sides of conductors 120, 220 for the purpose of effecting electrical resistance heating of their facing surfaces 124, 224 (FIG. 1) and the interposed reactive copper alloy sheet 126. Welding electrode jaws are preferably provided with textured copper surfaces 132, 232 for providing both good electrical contact with conductors 120, 220 and mechanical stability to the entire clamped assembly. The size and shape of the face of the welding electrodes is designed to provide reasonably uniform pressure over the workpiece surfaces to be joined. As a suitable electrical DC or AC current is delivered through the welding electrode jaws 130, 230 and textured surfaces 132, 232 they are actuated to apply pressure for the formation of solid state weld between facing surfaces 124, 224 of conductors 120, 220. The textured surface can consist of several types of roughness such as random asperities or a series of ridges and grooves arranged as concentric rings, transverse lines, longitudinal lines, cross-hatched patterns, star patterns, and other patterns. Typical peak-to-peak roughness should be no less than 10 micrometers to provide good electrical contact and mechanical keying. Roughness should be no greater than about 10% of the wire thickness to limit deformation of the wire, which in the case of a 3-mm thick rectangular wire would be 300 micrometers.

Figure 3:
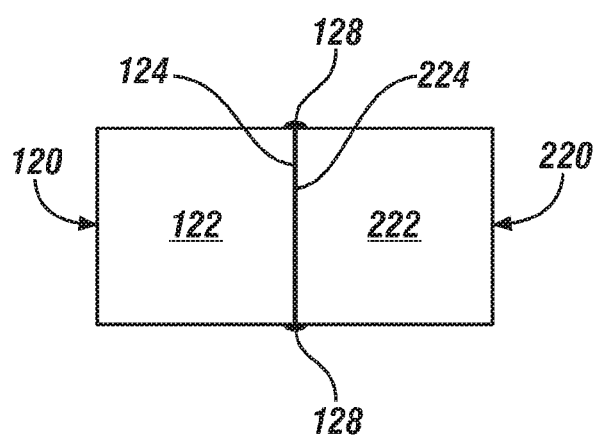
FIG. 3 is an enlarged schematic illustration of the ends of the copper conductor wires of FIGS. 1 and 2.

As an electric current is passed through conductors 120, 220 and their facing surfaces 124, 224, the reactive copper and phosphorus alloy material 126 liquefies and reacts (not necessarily in that order) to dissolve and flux oxides and other non-copper elements from the surfaces of the essentially copper material at facing surfaces 124, 224. As illustrated in FIG. 3, continued application of pressure to the heated facing surfaces 124, 224 brings the conductor facing surfaces 124, 224 together into intimate contact. Asperities on the copper surface that can prevent formation of a continuous weld are removed by a combination of reaction with the copper and phosphorus alloy as well as deformation from heat and pressure. The reaction by-products are expelled from the interface and accumulate as by-product bodies 128 at the edges of the now solid-state welded facing surfaces 124, 224. By-product bodies 128 solidify after the welding current is stopped and the welded conductor workpieces cool. By-product bodies 128 may or may not be removed from the welded conductors, and the welded ends of the conductors 120, 220 may be covered with an insulating and protective epoxy and/or varnish coating. The interface between the facing surfaces 124, 224 is a continuous, electrically conductive solid-state weld bond between the copper workpieces. The copper workpiece material does not melt to obtain the weld as it would in a typical fusion welding process. Rather the liquefied reactive metal material is such that it dissolves a small volume of material at the surface of the copper conductors, removing prior interfacial impurities and surface asperities as it is squeezed from the weld site.

In some embodiments of the invention, welds may be formed on a non-repetitive basis. In these cases a sheet of reactive weld material is prepared for placement between facing surfaces of copper workpieces. The workpieces are pressed against the thin layer of reactive metal and the interfacial region of the assembly heated to promote the reactive metallurgical weld. As stated above in this specification, examples of suitable reactive metal compositions for copper workpieces include alloys of copper and phosphorus, alloys of copper, phosphorus, and tin, alloys of copper, silver, and phosphorus, and suitable self fluxing braze alloys. Examples of specific alloys include binary copper-phosphorus alloys with 5 to 7.5 weight percent phosphorus, but with 6.5 to 7.5 weight percent phosphorus preferred for a low viscosity reaction product.

Suitable self fluxing braze alloys may also be considered for use.

Suitably, the thickness of the sheet of reactive metal material is in the range of about fifty to about two hundred fifty micrometers.

Figure 5:
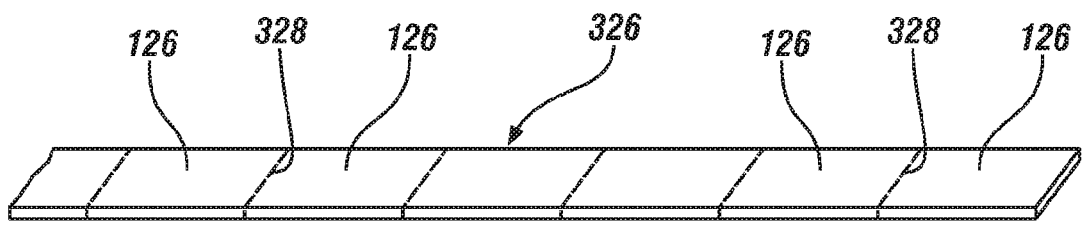
FIG. 5 illustrates an end portion of a perforated tape of reactive metal pieces for removal and use in the welding of many pairs of copper conductor wires.

In other embodiments of the invention, such as the assembly of a stator for an electric motor as illustrated in FIG. 4, many welds are made between adjacent pairs of like shaped copper workpieces. In these embodiments, a prepared roll of joined sheet pieces of reactive metal may be used. FIG. 5 illustrates a fragment of a long strip 326 of pieces of reactive metal 126 for use in welding electrical conductors 122, 222 as illustrated in FIGS. 1 and 2. In the example of FIG. 5, the individual reactive metal pieces 126 are separated by perforations 328. In preparing an assembly of the conductors 122, 222 as illustrated in FIGS. 1 and 2, an individual piece 126 may be separated from the strip 326 at a perforation 328 by welding electrode jaws 130, 230, or a robot, or the like, and placed between facing conductor pieces 122, 222 for forming each weld.

As an alternative, a solid foil strip similar to 326 without the perforations could be used. When placed between surfaces to be joined and heated, the portion lying within the gap would be melted, at which time the remaining solid strip could be retracted from the joint for later placement between the next pair of surfaces to be joined.

Practices of the invention have been illustrated in practices of some preferred embodiments. But the scope of the invention is not limited to the illustrations.

The invention claimed is:

1. A method of forming a solid-state weld between a first joining surface of a first copper workpiece and a second joining surface of a second copper workpiece; the method comprising:

preparing an assembly of the first and second copper workpieces with their first and second joining surfaces aligned surface-to-surface and separated with an interposed layer of reactive copper alloy material, the composition of the copper alloy material being selected to melt and react with surface material of each of the copper workpieces at a temperature below the melting point of either of the first and second copper workpieces;

pressing opposing electrical resistance heating electrode members against the first and second copper workpieces to press the first and second joining surfaces against the reactive copper alloy material and for electrical resistance heating of the reactive copper alloy material by passing an electrical current through the workpieces and reactive material at the first and second joining surfaces of the workpieces, the opposing electrical heating electrode members having textured surfaces for contacting the first and second copper workpieces and for reducing the electrical resistance at the contacts of the textured surfaces with the first and second copper workpieces, the textured surface of each electrode member being characterized by peak-to-peak roughness of no less than ten micrometers and no more than ten-percent of the thickness of the copper workpiece at the region of its contact;

electrical resistance heating the layer of reactive copper alloy material as it is engaged by the first and second joining surfaces for a predetermined time for the reactive copper alloy material to react with material at the joining surfaces of the copper workpieces and to form a liquid-containing reaction product; the pressure on the assembly acting to force substantially all thus-formed liquid reaction product from between the residual first and second joining surfaces; and, thereafter holding the first and second joining surfaces against each other until a solid-state welded joint is formed coextensively with the joining surfaces.

2. A method as recited in claim 1 in which the first and second copper workpieces are electrical conductors consisting essentially of commercially pure copper and having a melting point above 1080° C.

3. A method as recited in claim 1 in which the first and second copper workpieces are formed of copper alloys containing ninety-six percent by weight copper or higher and having a melting point above about 1000° C.

4. A method as recited in claim 1 in which the reactive copper alloy material has a solidus temperature below 720° C. and a liquidus temperature below 900° C.

5. A method as recited in claim 1 in which the reactive copper alloy material has a solidus temperature below 660° C. and a liquidus temperature below 850° C.

6. A method as recited in claim 1 in which the reactive copper alloy material is a copper-base alloy containing, by weight, at least 80% copper and the balance one or more of antimony, phosphorus, silicon, silver, and tin.

7. A method as recited in claim 1 in which the reactive copper alloy material consists essentially, by weight, of seven percent phosphorus and the balance copper.

8. A method as recited in claim 1 in which the reactive copper alloy material consists essentially, by weight, of 7% phosphorus, 7% tin, less than one percent silicon, and the balance copper.

9. A method as recited in claim 1 in which the reactive copper alloy material consists essentially, by weight, of fifteen percent silver, five percent phosphorus, and the balance copper.

10. A method as recited in claim 1 in which the interposed layer of reactive copper alloy material that is interposed between the facing surfaces of the first and second copper workpieces is a sheet of the reactive copper alloy material having a thickness no greater than about 250 micrometers and one or more such sheets is interposed to cover the facing first and second joining surfaces of the copper workpieces.

11. A method as recited in claim 1 in which a sheet of reactive copper alloy material is formed of individual pieces separated by perforations for use in welding more than one pair of first and second joining surfaces and successive pieces of the sheet are removed from the sheet at successive perforations in preparing the assembly of each of the more than one pairs of first and second joining surfaces.

12. A method as recited in claim 11 in which the sheet of reactive material has a thickness no greater than about 250 micrometers.

13. A method as recited in claim 11 in which a piece of the sheet is removed from the sheet and successively placed between each pair of first and second joining surfaces in preparing the assembly.

14. A method as recited in claim 11 in which a piece of the sheet is successively placed between each pair of first and second joining surfaces and each piece of the sheet is removed upon pressing the joining surfaces against the portion of the sheet.

15. A method as recited in claim 11 in which a piece of the sheet is successively placed between each pair of first and second joining surfaces and each piece of the sheet is removed upon pressing the joining surfaces against the piece of the sheet and heating the engaged sheet material.

16. A method as recited in claim 11 in which the sheet has perforated regions shaped for assembly between each of the more than one first and second joining surfaces and a perforated region is successively removed from the sheet in preparing the assembly of each of the more than one first and second joining surfaces.

17. A method as recited in claim 16 in which the perforated sheet is in the form of a rolled strip and a perforated region is successively removed from the strip in preparing each of the more than one assemblies.

18. A method of forming a solid-state weld between a pair of copper conductor bars for an electric motor, the copper conductor bars having facing surface areas to be joined in the solid-state weld, the facing surface areas being substantially the same in shape for the formation of the solid state weld coextensive with each facing surface area and the profiles of the facing surface areas allowing them to lie in substantially full face-to-face contact when they are assembled; the method comprising:

preparing an assembly of the first and second copper conductor bars, with their joining surfaces aligned surface-to-surface but separated with a layer of reactive copper alloy material, the thickness of the copper alloy material being no greater than about 250 micrometers and the composition of the copper alloy material being selected to melt and react with surface material of the copper conductor bars at a temperature below the melting point of either of the copper conductor bars;

pressing opposing electrical resistance heating electrode members against the first and second copper conductor bars to press the first and second joining surfaces against the reactive copper alloy material and for electrical resistance heating of the reactive copper alloy material by passing an electrical current through the conductor bars and reactive material at the first and second joining surfaces of the workpieces, the opposing electrical heating electrode members having textured surfaces for contacting the first and second copper conductor bars and for reducing the electrical resistance at the contacts of the textured surfaces with the first and second copper conductor bars, the textured surface of each electrode member being characterized by peak-to-peak roughness of no less than ten micrometers and no more than ten-percent of the thickness of the copper workpiece at the region of its contact;

electrical resistance heating the reactive copper alloy material in the assembly for a predetermined time for the reactive copper alloy material to react with material at the joining surfaces of the copper conductor bars and to form a liquid-containing reaction product; the pressure on the assembly acting to force substantially all formed liquid reaction product from between the residual joining surfaces, and, thereafter holding the joining surfaces against each other until a solid-state welded joint is formed coextensively with the joining surfaces.

19. A method as recited in claim 18 in which the first and second copper conductor bars are electrical conductors consisting essentially of commercially pure copper and having a melting point above 1080° C.

20. A method as recited in claim 18 in which the reactive copper alloy material has a solidus temperature below 720° C. and a liquidus temperature below 900° C.

21. A method as recited in claim 18 in which the reactive copper alloy material has a solidus temperature below 660° C. and a liquidus temperature below 850° C.

22. A method as recited in claim 18 in which the reactive copper alloy material is a copper-base alloy containing, by weight, at least 80% copper and the balance one or more of antimony, phosphorus, silicon, silver, and tin.

23. A method as recited in claim 18 in which the interposed layer of reactive copper alloy material that is interposed between the facing surfaces of the first and second copper conductor bars is a sheet of the reactive copper alloy material having a thickness no greater than about 250 micrometers and one or more such sheets is interposed to cover the facing first and second joining surfaces of the copper conductor bars.

* * * * *